United States Patent [19]

Tanaka

[11] Patent Number: 5,403,147
[45] Date of Patent: Apr. 4, 1995

[54] METHOD FOR WAREHOUSING AND DELIVERY OF ARTICLES

[75] Inventor: Nobuhiro Tanaka, Saitama, Japan

[73] Assignee: Kao Corporation, Tokyo, Japan

[21] Appl. No.: 904,346

[22] Filed: Jun. 25, 1992

[30] Foreign Application Priority Data

Jun. 28, 1991 [JP] Japan ................. 3-184019
Jun. 28, 1991 [JP] Japan ................. 3-184020

[51] Int. Cl.$^6$ ............................................ B65G 1/00
[52] U.S. Cl. ................................. 414/786; 364/478; 414/273
[58] Field of Search ............... 414/786, 273, 281; 364/478

[56] References Cited

U.S. PATENT DOCUMENTS

| | | | |
|---|---|---|---|
| 3,705,410 | 12/1972 | Kooy et al. | 364/478 X |
| 4,195,347 | 3/1980 | MacMunn et al. | 414/273 X |
| 4,312,623 | 1/1982 | Allred et al. | 414/273 X |
| 4,679,149 | 7/1987 | Merz | 364/478 |
| 4,921,087 | 5/1990 | Nakamura | 414/273 X |
| 5,163,802 | 11/1992 | Poinelli | 364/478 X |

FOREIGN PATENT DOCUMENTS

| | | |
|---|---|---|
| 0235488 | 9/1987 | European Pat. Off. |
| 143581 | 6/1969 | Germany . |
| 3738052 | 5/1989 | Germany . |
| 59-28481 | 7/1984 | Japan . |
| 229701 | 10/1986 | Japan ................. 414/273 |
| 238601 | 10/1986 | Japan ................. 414/273 |
| 248801 | 11/1986 | Japan ................. 414/273 |
| 62-21681 | 5/1987 | Japan . |
| 185603 | 8/1987 | Japan ................. 414/273 |
| 242803 | 10/1988 | Japan ................. 414/273 |
| 81704 | 3/1989 | Japan ................. 414/273 |
| 197207 | 8/1989 | Japan ................. 414/273 |
| 243538 | 9/1989 | Japan ................. 414/273 |
| 16402 | 1/1992 | Japan ................. 414/273 |
| 451013 | 5/1968 | Switzerland . |
| 749762 | 7/1980 | U.S.S.R. ............. 414/273 |
| 9011572 | 10/1990 | WIPO . |

OTHER PUBLICATIONS

Patent Abstracts of Japan, vol. 9, No. 300 (M-433)(2023) 27 Nov. 1985.
BBC-Nachrichten, vol. 53, No. 7/8, Aug. 1971, pp. 212, 217.
Fördern und Heben, vol. 34, No. 3, Mar., 1984, Aschaffenburg, pp. 210-211, "Eine Nachschuborganisation Für Paletten Bei Begrenzter Stellplatzzahl".

*Primary Examiner*—David A. Bucci
*Attorney, Agent, or Firm*—Dvorak and Traub

[57] ABSTRACT

A method for storing articles in an automatic storage facility 10 comprises steps of checking whether a scheduled warehousing amount of articles is greater than an available storage capacity of an intended storage facility on the basis of the scheduled warehousing amount and the available storage capacity, and assigning partial amount of the scheduled warehousing articles to warehouse in an overflow area 26 when the scheduled warehousing amount is greater than the available storage capacity, and subsequently initiating warehousing operation for all of articles to be warehoused to the automatic storage facility 10 and the overflow area 26.

6 Claims, 9 Drawing Sheets

FIG. 5

| | | | |
|---|---|---|---|
| NO.3 RACK SYSTEM (AUXILIARY STORAGE FACILITY) | BC MANAGEMENT GRADE ARTICLES COMMON STORAGE PORTION | | ABC MANAGEMENT GRADE ARTICLES COMMON STORAGE PORTION |
| NO.2 RACK SYSTEM (AUXILIARY STORAGE FACILITY) | BC MANAGEMENT GRADE ARTICLES COMMON STORAGE PORTION | | ABC MANAGEMENT GRADE ARTICLES COMMON STORAGE PORTION |
| NO.1 RACK SYSTEM (PRIMARY STORAGE FACILITY) | A MANAGEMENT GRADE ARTICLES SPECIALIZED STORAGE PORTION | A MANAGEMENT GRADE ARTICLES COMMON STORAGE PORTION | |

WAREHOUSING PROCESS FLOW

METHOD FOR WAREHOUSING AND DELIVERY OF ARTICLES

BACKGROUND OF THE INVENTION

1. Field of the Invention

The present invention relates to a method of warehousing and storing articles in a storage facility, such as an automatic storage. More specifically, the invention relates to a warehousing method, which involves preliminary calculation of the amount of articles to be out of storage capacity of the storage facility, performing warehousing setting so as to store the articles which cannot be stored in the storage facility in question, in other storage means, and thereafter performing the warehousing of the articles.

The present invention also relates to a method for warehousing and storing delivering articles for storing and delivering articles in and from a storage facility, such as an automatic warehouse. Particularly, the invention relates to a warehousing and delivering method employing a storage facility including a primary storage facility having a specialized storage portion for exclusively storing preliminarily predetermined articles and a common storage portion for storing random articles, and an auxiliary storage facility having a common storage portion.

2. Description of the Related Art (A) A prior disclosure of a warehousing method appears in Japanese Examined Patent Publication (Kokoku) No. 62-21681, which discloses an article handling facility, wherein pallets (articles) are transported to a transporting facility and are stored in a three dimensional automatic storage facility, and are delivered to a picking shelf for temporarily storing therein, after which a desired amount of the articles are taken out from the picking shelf.

However, the above-mentioned prior art concept has the following problems.

Namely, the article handling facility disclosed in Japanese Examined Patent Publication No. 62-21681 does not discuss nor suggest the capacity for preliminary judgement as to whether all amounts of the articles intended to stored can be received within the intended storage facility or not. If the warehousing operation is performed without knowing that the capacity of the vacant storage shelf is smaller than the intended amount of articles to be stored, the storage shelf would become full before the intended amount of articles are stored. At this time, when warehousing operation is performed in random order, it is possible to leave the articles which are indeed required to be stored (e.g. shorting the stock amount), among the intended articles. In such case, the articles which are already stored but which are less important than the articles just left, are removed from the storage shelf to make vacant space for the just left necessary articles. This is clearly wasteful work.

Accordingly, it is an object of the present invention to provide a warehousing method, in which a preliminary calculation is performed to check whether all intended amounts of articles can be stored in the intended storage facility, and if not all intended amount of articles can be stored, the articles which are indeed required to be stored (shorting the stock amount) are given higher priority in the warehousing operation.

(B) A prior art for a method of warehousing and delivering articles in and from a storage facility is disclosed in Japanese Examined Patent Publication No. 59-28481. This publication discloses a warehousing and delivering method involving a three dimensional storage concept, in which the storage area groups of a three dimensional storage shelves are separated into a warehousing and delivering common zone and a stocking zone, where the transferring of the articles between the warehousing and delivering common zone and the stocking zone is performed by means of a stacker crane in an idle time zone, such as night time, in which warehousing and delivering operations are stopped to perform warehousing and delivery.

However, the above-mentioned prior art holds the following drawbacks.

Although the warehousing and delivery methods in the three dimensional storage concept disclosed in Japanese Examined Patent Publication No. 59-28481, can effectively perform warehousing and delivery by separating the storage area groups of the three dimensional storage shelves into the warehousing and delivery common zone and stocking zone, and transferring the articles between the stocking zone and the warehousing and delivery common zone, there is no disclosure or suggestion for warehousing the articles in the storage facility including a primary storage facility having a specialized storage portion for exclusively storing preliminary set articles and a common storage portion for storing random articles, as well as an auxiliary storage facility having the common storage portion. Furthermore, the method disclosed in the above-identified publication is directed to a technology for efficiently warehousing and delivering articles in and from a single storage facility. Such method will not create the problem in a pushup type storage system in which the articles stored earlier among the same kind of articles are delivered earlier. However, the publication has no disclosure or suggestion for performing a pushup manner warehousing and delivery in only one of a plurality of storage facilities.

Accordingly, an object of the present invention is to provide a warehousing and delivering method, in which a storage facility including a primary storage facility having a specialized storage portion and a common storage portion, and an auxiliary storage facility having the common storage portion, and in which warehousing is performed so as to facilitate pushup system delivery for the same kind of articles so that the articles stored earlier are delivered earlier.

SUMMARY OF THE INVENTION

According to one aspect of the invention, a warehousing method for storing articles in a storage facility (automatic storage) comprises the steps of:

checking whether a scheduled warehousing amount of articles is greater than an available storage capacity of an intended storage facility on the basis of the scheduled warehousing amount and the available storage capacity, and assigning partial amount of the scheduled warehousing articles to warehouse in a secondary storage facility (overflow area) other than the intended storage facility when the scheduled warehousing amount is greater than the available storage capacity; and subsequently initiating a warehousing operation for all of the articles to be warehoused in the intended storage facility and the secondary storage facility.

In the above-mentioned construction, the articles assigned to be stored in the secondary storage facility, may be warehoused in the assigned secondary storage facility through a warehousing facility (stacker crane) of the intended storage facility.

The preferred warehousing method may further comprise a step of warehousing verification on the basis of a scheduled warehousing information and resultant warehousing information.

Also, in the preferred warehousing method set forth above, when the scheduled warehousing amount of the articles is smaller than the available storage capacity and when any articles are stored in the secondary storage, calculation may be performed for an amount of articles stored in the second storage facility to be transferred to the intended storage facility.

According to another aspect of the invention, a warehousing method for warehousing articles in a storage facility (automatic storage) including a primary storage facility (No. 1 rack system) for exclusively storing preliminarily registered articles (PFC registered articles) and an auxiliary storage facility (No. 2 and No. 3 rack systems), is characterized in that the primary storage facility is provided with a plurality of spaces (specialized storage portion), each of which is adapted to exclusively store specific one of a kind registered articles in a predetermined amount.

In the preferred construction, the method may be applicable for a storage system wherein the primary storage facility includes a specialized storage portion exclusively storing one skid of the registered articles and a common storage portion for storing the registered articles and other articles, and the auxiliary storage facility including the common storage facility.

In the preferred method, when the articles to be warehoused are one of the registered articles and not stocked in the storage or are stocked only in the primary storage facility, the articles are warehoused in the primary storage facility with higher priority, and when the articles to be warehoused are one of the registered articles and stocked in the auxiliary storage facility, the articles are warehoused in the common storage portion of the primary storage facility or the auxiliary storage facility.

The primary storage facility may be provided with a specialized delivery port (PFC) for exclusively delivering the registered articles.

According to a further aspect of the invention, a delivery method for delivering articles from a storage facility including a primary storage facility having a specialized storage portion exclusively storing preliminarily registered articles and a common storage portion for randomly storing articles, is characterized in that when one kind of article having earlier warehousing date than that of the corresponding kind of article stocked in the common storage portion of the primary storage facility is stored in the auxiliary storage facility and there are vacant spaces in the specialized storage portion of the primary storage facility, the articles in the auxiliary storage facility are delivered after being transferred to the specialized storage portion of the primary storage facility.

According to a still further aspect of the invention, a transfer method for the articles for transferring articles between a primary storage facility having a specialized delivery port for exclusively delivering preliminarily registered articles and an auxiliary storage facility, is characterized in that when a specialized storage portion for exclusively storing preliminarily registered articles becomes vacant, and when the articles having the oldest warehousing date are stocked in the auxiliary storage facility, the oldest articles are transferred to the specialized storage portion of the primary storage facility.

In the first aspect of the article warehousing method, determination is made as to whether all scheduled articles can be received in the intended storage facility in advance for initiation of warehousing operation. If not all of the scheduled articles can be accepted in the intended facility, the articles which are not currently necessary are stored in another storage facility so that the articles which are currently necessary can be stored in the intended storage facility with higher priority.

In the second to fourth aspect of the invention, the article warehousing and delivering method is applied to the storage system having a primary storage facility with a specialized storage portion and a common storage portion, and a auxiliary storage facility having a common storage portion. In the process set forth above, pushup type delivery can be facilitated by this manner of warehousing so as to permit delivery of articles in order of warehoused order.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention but are for explanation and understanding only.

In the drawings.

FIG. 5 is an explanatory and diagrammatic illustration showing storage frame in the automatic storage;

DESCRIPTION OF THE PREFERRED EMBODIMENT

AUTOMATIC STORAGE

Figure 1:
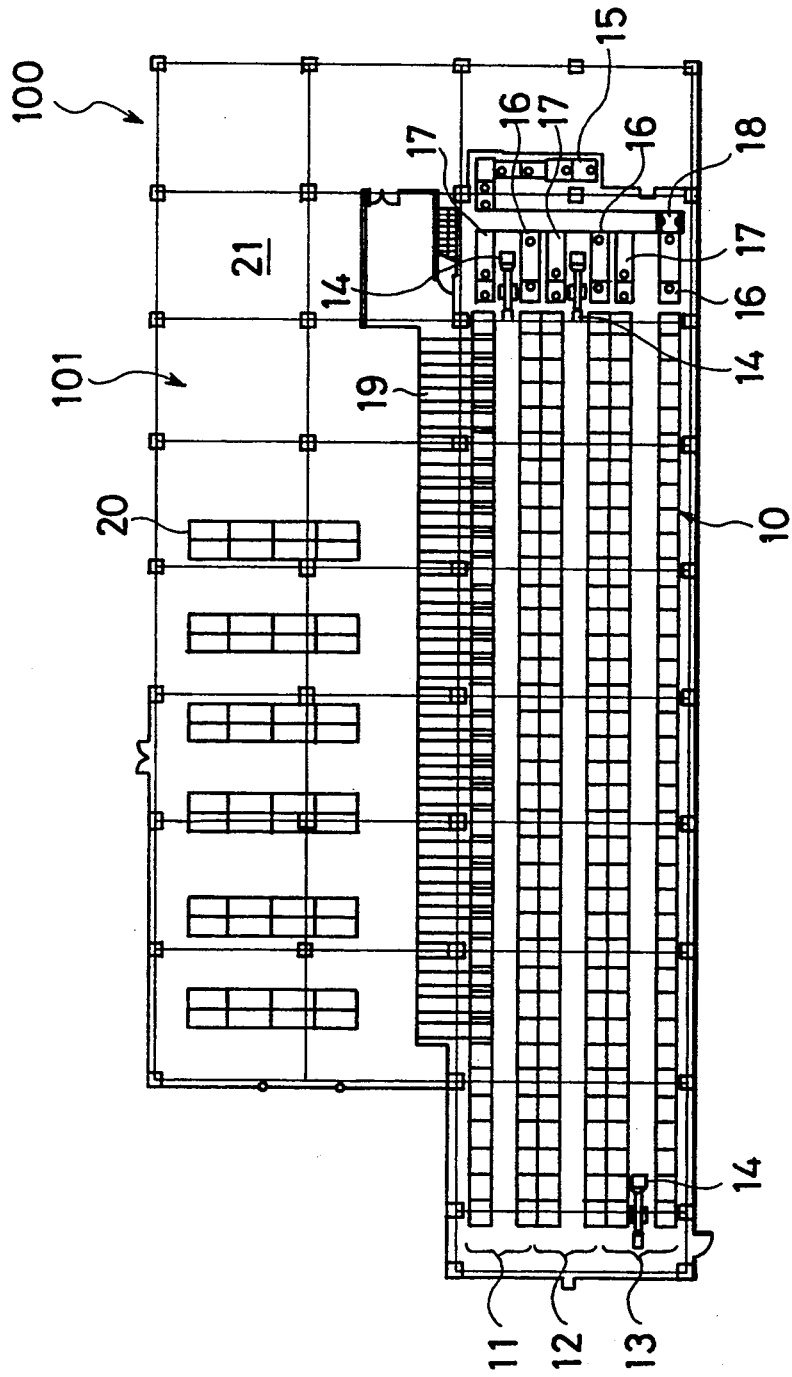
FIG. 1 is an illustration showing layout of the first floor of a trading center having an automatic storage facility or warehouse for which the present invention is applicable.

An automatic storage 10 has a No. 1 rack system 11 (primary storage facility), No. 2 and No. 3 rack systems 12 and 13 (auxiliary storage facility) arranged in parallel relationship to each other. Each of the No. 1, No. 2 and No. 3 rack systems 11, 12 and 13 has multi-column and multi-row racks. For each of the rack systems 11, 12 and 13, a stacker crane 14 is provided independently of each other.

(1) Explanation for Layout at the First Floor (see FIG. 1)

A storage housing 101 adjacent to the automatic storage 10 has a three floor construction. The storage house 101 and the automatic storage 10 form a trade center 100 in combination. In the first floor of the storage housing 101, there are provided a warehousing and delivery common conveyer 15 which transfers articles packed in a carton and mounted on a pallet to and from a fork lift, a warehousing conveyer 16 feeding articles to stacker cranes 14 of respective rack systems 11~13, and a delivery conveyer 17 receiving the articles from the stacker crane 14 of the rack systems 11~13, and a traverser 18 for transferring articles between a branched end of the warehousing and delivery common conveyer 15 and all conveyers 16 and 17.

In addition, on the first floor, 23 pallet conveyers (PFC) 19 (A management grade articles picking facility) are provided mutually independently of each other. Each pallet conveyer 19 is adapted for exclusively picking one of 23 kinds of A management grade articles which will be discussed later.

Also, in the first floor, for picking BC management articles which will be discussed later, pallet racks 20 (BC management grade article picking facility) are provided. The pallet racks 20 are separated for receipt of BC management grade articles.

In addition, a package aligning area 21 is defined on the first floor.

Figure 2:
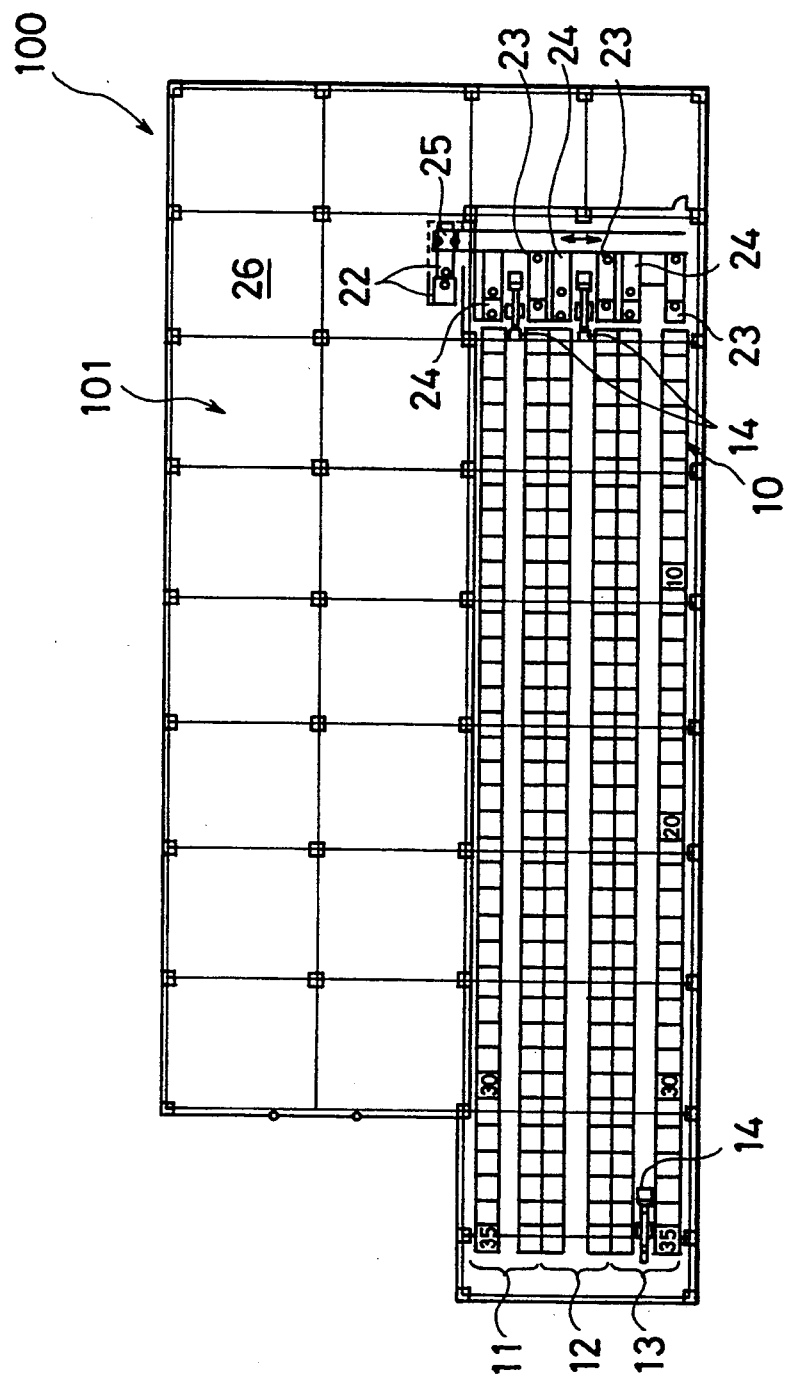
FIG. 2 is an illustration showing layout in the second and third floors.

(2) Explanation of Layout of the Second and Third Floor (see FIG. 2)

The layouts in the second and third floors of the storage housing 101 are identical to each other. In each of the second and third floors, there are provided a warehousing and delivery common conveyer 22 for transferring articles to and from the fork lift, a warehousing conveyer 23 for feeding articles to the stacker cranes 14 of respective racks 11 to 13, a delivery conveyer 24 for receiving articles from the stacker cranes 14 of respective racks 11 to 13, and a traverser 25 for transferring between the warehousing and delivery common conveyer 22 and all other conveyers 23 and 24.

In addition, in the second and third floors, an overflow area 26 (other storage facility) for storing latter-mentioned overflowing articles is provided.

Figure 3:
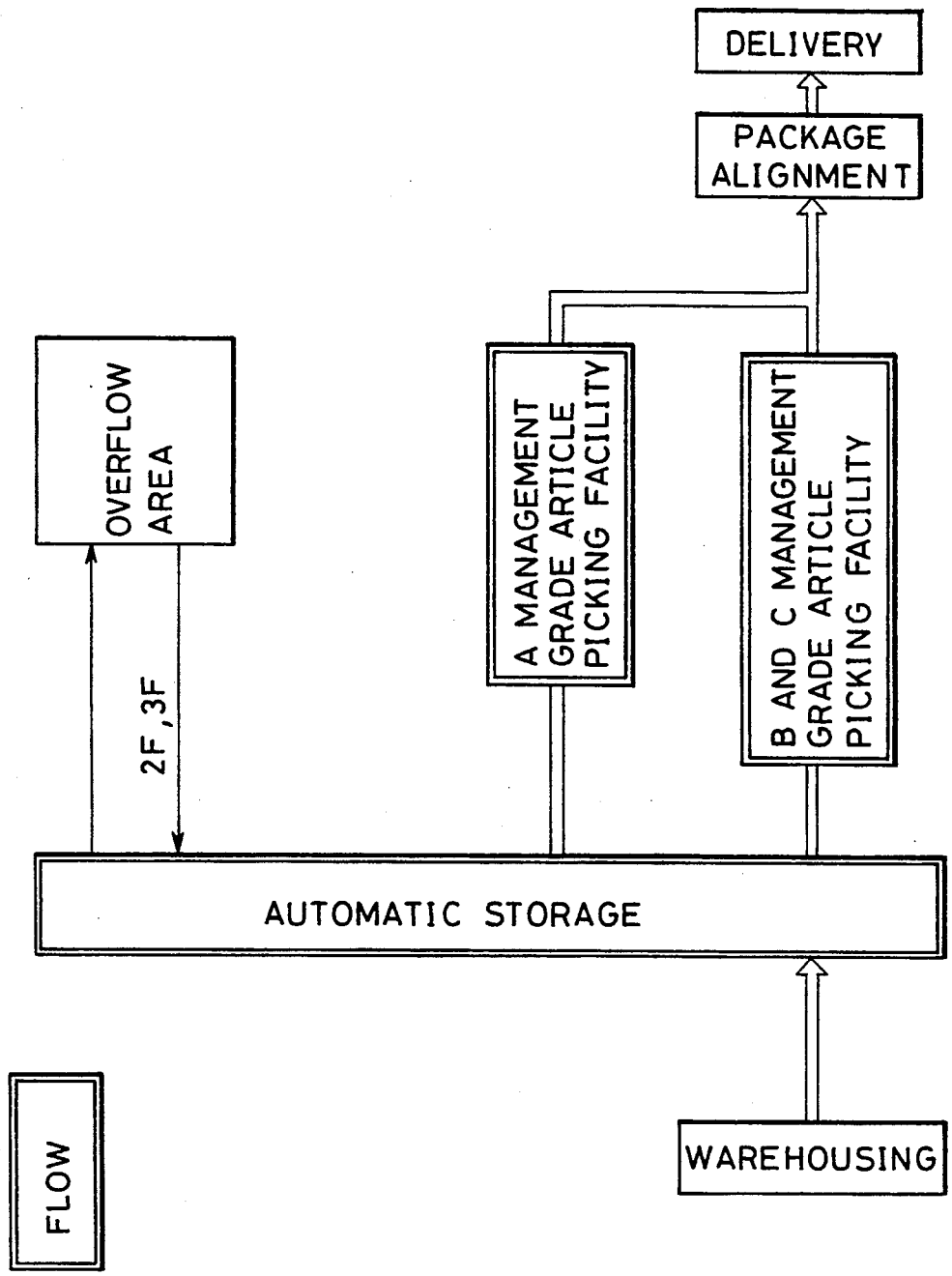
FIG. 3 is a flow diagram showing a transporting system, to which the present invention is applied.

TRANSPORTING SYSTEM AND CONTROL SYSTEM (1) Transporting System Employing Automatic Storage 10 (see FIG. 3)

The articles in a transporting container delivered to the trading center 100 by means of tracks or the like, may form a unit pallet which becomes full when a predetermined amount of one kind of articles is deposited. The unit pallet which is fully filled with the predetermined amount of articles, will be hereafter referred to as "filled pallet unit". The filled pallet unit is stacked in respective racks 11 to 13 of the automatic storage 10 for each pallet unit.

It should be appreciated that, in the shown embodiment, there is only one profile of the filled pallet units.. However, practically, the profile of the filled pallet units may be variable depending upon the nature of articles or so forth and can be differentiated in wide variety. In such case, it is possible to divide the filled pallet units into those having high height (high profile pallets) and those having low height (low profile pallets) and to provide two mutually distinct rack systems adapted to respective of the high profile pallets and the low profile pallets, in the automatic storage 10.

The articles to be warehoused in the automatic storage 10 are stored in either one of racks 11 to 13, or in the alternative, in the overflow area 26, according to the latter-mentioned "automatic storage control concept". It should be noted that the articles stored in the overflow area 26 will be re-stored in the selected one of the racks 11 to 13, later.

Among the articles stored in the racks 11 to 13 of the automatic storage 10, the A management grade articles are directly fed out to the pallet flow conveyer 19 on filled pallet units by means of the stacker crane 14 of the No.. 1 rack system 11. The A management grade articles thus fed out are picked in a unit of carton from the pallet flow conveyer 19. On the other hand, the BC management grade articles are fed out through the delivery conveyer 17, the traverser 18 and the warehousing and delivery common conveyer 15 by the stacker cranes 14 of the No. 2 rack system 12 and No. 3 rack system 3. Then, the BC management grade articles are transferred to the pallet rack 20 by means of the fork lift, and picked in the unit of the carton from the pallet rack 20. The picked A management grade articles and BC management grade articles are delivered to the tracks or the like through the package aligning area 21.

Figure 4:
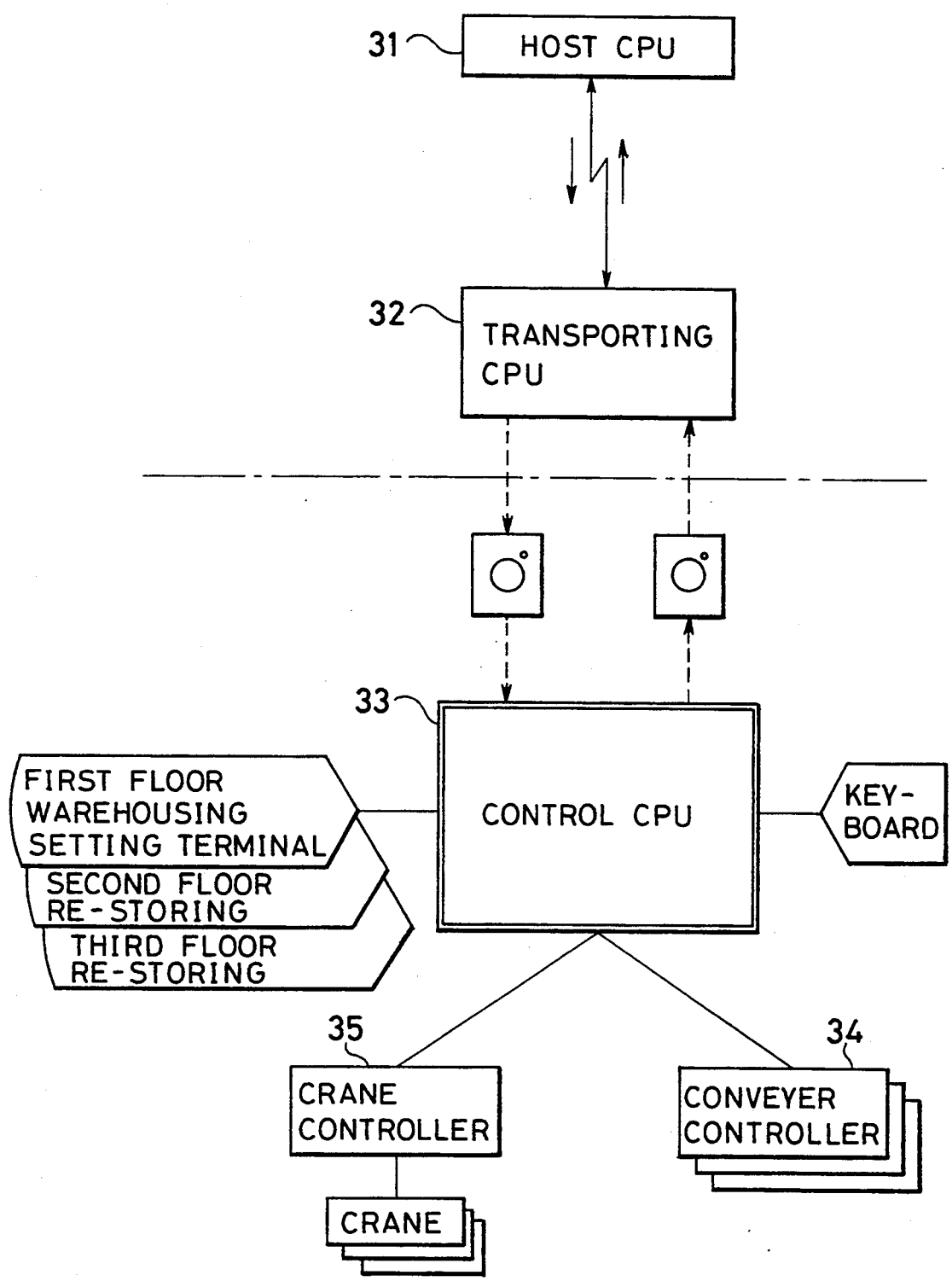
FIG. 4 is a block diagram showing control system in the transporting system.

(2) Control System for Automatic Storage 10 (see FIG. 4)

A control system for the automatic storage 10 comprises a host CPU 31, a transporting CPU 32 and a control CPU 33.

The host CPU 31 transmits a received order to the transporting CPU 32 and receives delivery results information from the transporting CPU 32 for performing business information processing.

The transporting CPU 32 transmits warehousing schedule data, article codes and so forth to the control CPU 33 and receives warehousing result data, stock data and so forth to generate a warehousing schedule plan, a picking plan and a supply plan.

The control CPU 33 controls respective conveyers 15, 16, 17, 22, 23 and 24 and traversers 18 and 25 through a conveyer controller 34 and the stacker cranes 14 through a crane controller 35, by a keyboard, a first floor warehousing setting terminal, a second floor re-storing terminal and a third floor re-storing terminal so as to perform articles warehousing and delivery operations.

AUTOMATIC STORAGE CONTROL CONCEPT (1) Storage Frame of Automatic Storage 10 (see FIG. 5)

The automatic storage 10 has the No. 1 rack 11 as a primary storage facility and Nos. 2 and 3 racks 12 and 13 as the auxiliary storage facility.

The No. 1 rack 11 has A management specialized storage portions respectively adapted to store specific kinds of A management grade articles and A management grade articles common storage portion for storing any of the A management grade articles irrespective of kinds, with respect to the A management grade articles (PFC registered articles) to be delivered by the pallet flow conveyer 19.

The No. 2 rack 12 and the No. 3 rack 13 has BC management grade articles common storage portions for storing any of the BC management grade articles irrespective of the kinds thereof and ABC management grade articles common storage portions for storing any of the A and BC management grade articles irrespective of the kinds.

It should be noted that, in the shown embodiment, the upper 23 kinds of articles in order of delivery amount are assigned as A management grade articles, and other articles are set as BC management grade articles. In general, the management grade articles are referred to the articles having the integrated delivery amount up to 80% of the overall integrated delivery amount in order from the greater delivery amount. The B management grade articles are referred to the articles having the integrated delivery amount up to remaining 15% of the overall integrated delivery amount. The C management grade articles are those articles having the integrated delivery amount at the lower 5%.

Here, the number of storage frame for respective management grade articles in the automatic storage 10 is determined in view of minimum stock amounts for respective kinds of articles. The necessary minimum article amount may be the amount satisfying the delivery amount for one time or one day.

(2) Overflow Processing

When there are articles in amount exceeding total available rack capacity of the automatic storage 10, part of ABC management grade articles specified by kind are overflown to the overflow areas 26 in the second and third floors.

It should be noted that the practical process of overflow processing is performed according to the flowchart illustrated in FIGS. 7 and 8 discussed later.

(3) Priority Storage of BC Management Grade Articles in Automatic Storage

The No. 2 rack system 12 and the No. 3 rack system 13 have the BC management grade articles common storage portion, and the ABC management grade articles common storage portion, as set forth above. In the ABC management grade articles common storage portion, priority storage can be made for the BC management grade articles warehousing beyond the storage frame number of the BC management grade article common storage portion. This is because all kinds of the BC management grade articles have to be stored in the BC management grade article common storage portion, and it is necessary not to permit the A management grade article to be stored in the BC management grade article storage portion. Also, when a plurality of BC management grade articles are overflown, setting of kinds for re-storing is frequently undertaken to make administration troublesome. For this reason, the BC management grade articles are generally stored in the racks, and the A management grade articles which have smaller number of kinds and thus easier to manage is passed to overflow.

(4) Minimum Stock of A Management Grade Articles in No. 1 Rack and Automatic Stock Transfer Each kind of the A management articles is supplied and delivered in order through the pallet flow conveyer 19 provided for each kind of the articles along the No. 1 rack system 11. Accordingly, it is required to constantly stock a given amount of all kinds of the A management grade articles in the No. 1 rack system 11. Therefore, the frame (specialized storage portion) of the A management grade articles is assigned in the No. 1 rack 11 in such a manner that ten pallets (10 shelves) are assigned for each kind of the A management grade articles, for example. Other storage portions (shelves) of the No. 1 rack system 11 are provided for storing any of the A management grade articles. When the stock amount of the certain kind of the A management grade articles becomes 4 pallets, 6 pallets as a unit are automatically transferred from the ABC management grade article common storage portions the No. 2 and No. 3 rack systems 12 and 13.

Here, in the above-mentioned example, the 10 pallets of the specialized storage portion assigned for each kind of the A management grade articles is the maximum (estimated amount or actually delivered amount) per day, the 4 pallet is an average amount (actually delivered amount) of delivery per one delivery or one day, or, in the alternative, the amount which will never cause absence of stock.

Also, the 6 pallet unit represents the pallet amount which can be transferred by the delivery conveyers 17 and 24 (2 pallets×2 lines) of the No. 2 and No. 3 rack systems 12 and 13 and by the warehousing conveyer 16 and 23 (2 pallets) of the No. 1 rack system 11, at one time.

Figure 9:
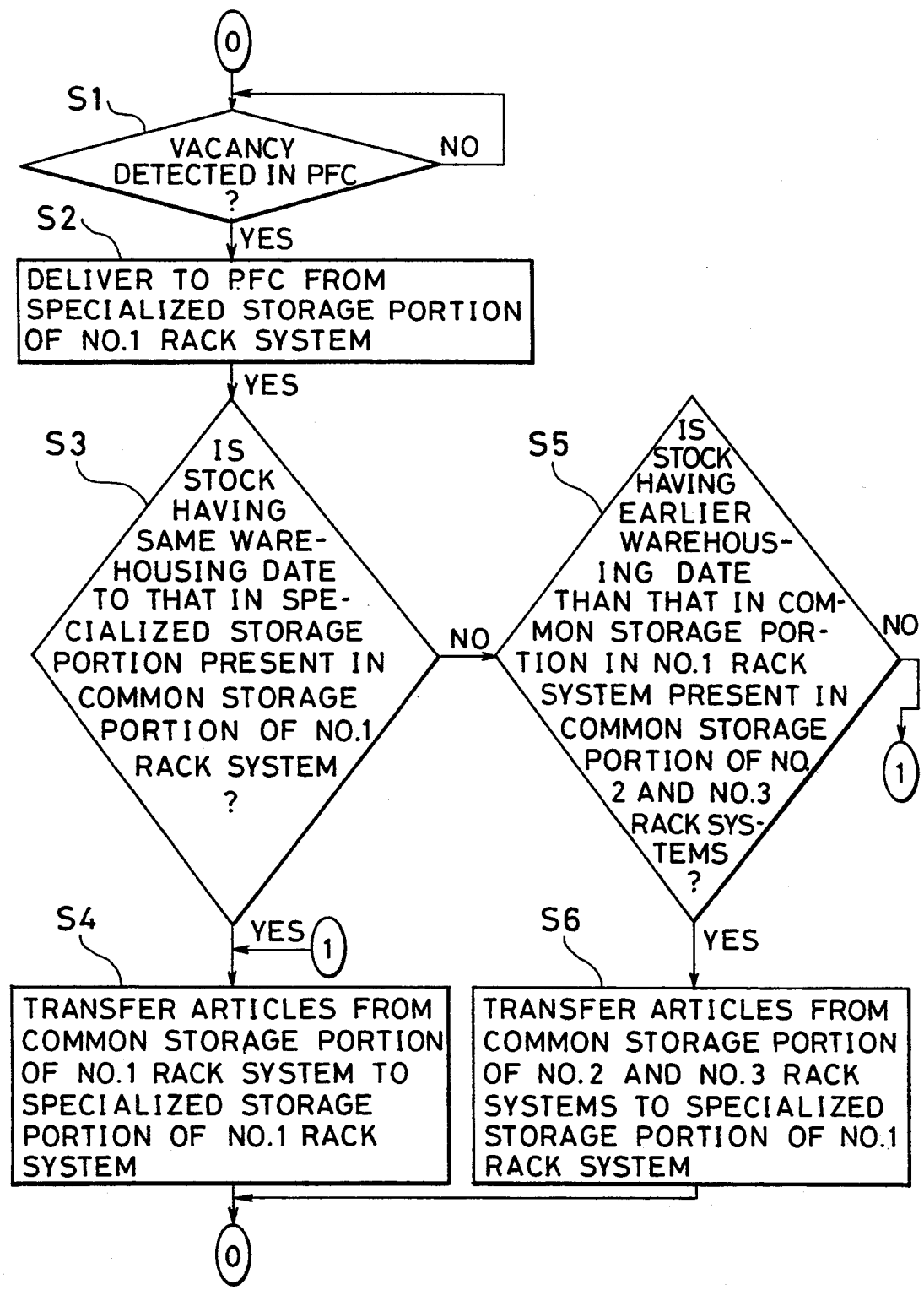
FIG. 9 is a flowchart showing an automatic stock transporting process.

It should be noted that the practical operation of the automatic stock transfer will be discussed in connection with the flowchart of FIG. 9.

(5) Method of Stock Management

The management of the stock stored in each rack system 11 to 13 of the automatic storage 10 is adapted to pushup type delivery in the unit of warehousing day rot (with reference to the date of warehousing the articles in the automatic storage 10), so as to maintain quality of the articles.

(6) Warehousing and Delivery Priority Process of Crane

The functions of warehousing and delivering of the stacker crane 14 in each of the rack systems 11 to 13 is (a) delivery of the A management grade articles to the pallet flow conveyer 19, (b) delivery of the A and BC management grade articles to the overflow area 26 and delivery of the BC management grade articles to the pallet rack 20, (c) automatic stock transfer of the A management grade articles, (d) new warehousing of A and BC management grade articles and re-storing from the overflow area 26.

In the shown embodiment, when the stacker crane 14 provides uniform services for respective operations, each operation will be prolonged. Therefore, process is performed concentrically to limit the processing rot number in order of given higher priority. In the shown example, priority is given in the descending order of (a)→(b)→(c)→(d). The process rot number is given to 1 pallet for the process (a), 10 pallets for the process (b), 6 pallets for process (c) and 1 pallet for the process (d).

Figure 6:
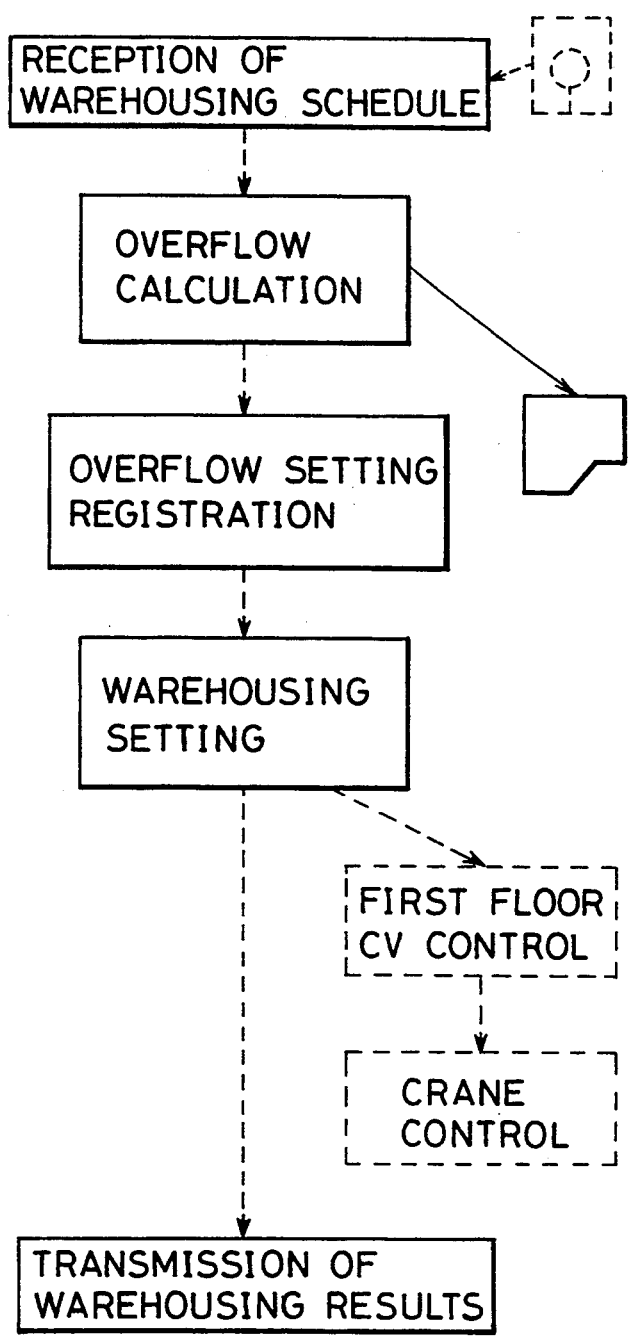
FIG. 6 is a flowchart showing a manner of a warehousing process.

PRACTICAL EXAMPLE OF TRANSPORTING PROCESS (1) Warehousing Process (see FIG. 6)

The warehousing process for the articles to the automatic storage 10 is performed through the following processes.

1) The control CPU 33 receives the warehousing schedule data (container code, article name, amount) from the transporting CPU 32 by the one day before the date at which warehousing is performed. This warehousing data is written in the warehousing schedule file.

2) Before starting warehousing (in the morning of the date to perform warehousing), when the operator starts up the control CPU 33, the control CPU 33 initiates the overflow calculation process illustrated in FIG. 7 which will be discussed later to perform calculation of overflow for respective ones of the A management grade articles and BC management grade articles to generate an overflow list.

3) The operator makes Judgement for the articles and amount to make overflowing and performs setting of overflowing articles in the control CPU 33. The control CPU 33 writes this overflow registration data (container code, the article name, amount and overflow area floor) in the warehousing schedule file.

4) The operator performs warehousing setting of the following (a) and (b) according to the warehousing schedule file written in the control CPU 33.

(a) With the operation of the first floor warehousing setting terminal of the control CPU 33, "warehousing schedule menu" is opened. Then, through the menu, the container code of the container intended to be warehoused, is entered to open "container dependent menu". In the "container dependent menu", the article name and amount contained in the corresponding container is displayed.

(b) When the pallet profile of the articles to be warehoused and identified in (a) is the filled pallet (the pallet mounting the predetermined amount of cartons), the article name and the number of pallets are entered.

On the other hand, if the pallet profile of the articles to be warehoused and identified in (a) is a partial pallet (the pallet mounting lesser number of cartons than the predetermined amount of cartons), such pallet is assigned to be stored in the place other than the rack and the overflow area of the automatic storage 10 after entering the article name and number of the pallets.

It should be noted that, in the automatic storage 10, if the actual warehousing amount is greater than the scheduled warehousing amount, or the actual warehousing articles are not the scheduled articles, the warehousing of those articles may be accepted. On the other hand, in the first floor warehousing setting terminal, the scheduled warehousing amount and the resultant warehousing amount are displayed. Therefore, the operator may perform warehousing verification on the basis of the scheduled warehousing information and the resultant warehousing information.

5) By warehousing setting under the foregoing (4), the control CPU 33 enters into the warehousing setting process which will be discussed in connection with FIG. 8, and initiates operation of the conveyer controller 34 and the crane controller 35.

At this time, the controlling CPU 33 performs the warehousing control of the following (a) to (d).

(a) In response to a branching request signal indicative of the pallet reaching at the branching end of the warehousing and delivery common conveyer 15, one of the stacker cranes 14 of respective rack 11 to 13 is assigned in the following manner.

The A management grade articles are assigned with priority for the stacker crane 14 of the No. 1 rack system 11. The BC management grade articles are assigned only for the stacker cranes 14 of the No. 2 and No. 3 rack systems 12 and 13. However, when the stacker crane 14 is in the inoperative state, the warehousing conveyer 16 or 23 corresponding to the stacker crane 14 is in failure or is full, or the rack corresponding to the stacker crane 14 is full, the other vacant crane 14 will be assigned for service.

(b) If there is no stock of the A management grade articles in the No. 2 and No. 3 rack systems 12 and 13 and the stock of the corresponding kind of articles in the No. 1 rack system 11 is less than 10 pallet (including the case where the stock is 0), the pallet waits to be assigned to the No. 1 rack system 11. When some kind of the A management grade articles is not present in the No. 2 and No. 3 rack systems 12 and 13, and the same kind of the articles in the No. 1 rack system 11 is less than 10 pallets (less than the amount for the specialized storage frame of the A management grade articles), even when it is warehoused in the No. 2 or No. 3 rack system 12 or 13, transfer command will be instantly generated. Therefore, such A management grade articles will wait until the stacker crane 14 of the No. 1 rack system 11 enters into the stand-by state or the warehousing conveyer 16 of the No. 1 rack system 11 becomes vacant.

The BC management grade articles are assigned for the No. 2 and No. 3 rack systems 12 and 13 so that even amounts are stocked. With respect to the BC management grade articles, the same kind of the articles are stored in the No. 2 and No. 3 rack systems 12 and 13 in substantially the same amount so that delivery operation will never be stalled even when one of the stacker cranes 14 of the No. 2 and No. 3 rack systems 12 and 13 is down.

(c) The controlling CPU 33 performs shelf assignment (search) with respect to the rack warehousing articles from the vacant shelf closest to the loading station (tip end conveyer of the warehousing conveyer 16) of the warehousing conveyer 16, and outputs operation command for the stacker crane 14.

It should be noted that when the A management grade articles are warehoused within the No. 1 rack system 11, if the pallet flow conveyer 19 is in the no stock condition, the pallet is directly delivered to the pallet flow conveyer 19.

(d) The controlling CPU 33 confirms operation enabling condition for conveyer delivery operation of the overflow area floor, and then output the operation command for the stacker crane 14.

When the delivery sub-conveyers of the second and third floors become full with overflow articles, operation command for the stacker crane 14 cannot operate. Therefore, waiting state is maintained until the delivery sub-conveyers become available.

It is possible to process the set operation while the second and third floors are used as re-storing line of the overflowing articles and terminate warehousing operation after completion of the set process, for performing overflowing process.

6) The resultant warehousing data (container code, article name, storage space dependent resultant number of warehousing) of the container for which warehousing operation is completed is written in a floppy disk (FD) from the control CPU 33. The floppy disk (FD) is then transferred to the transporting CPU 32. The transporting CPU 32 updates the stock on the basis of the resultant warehousing data.

Figure 7:
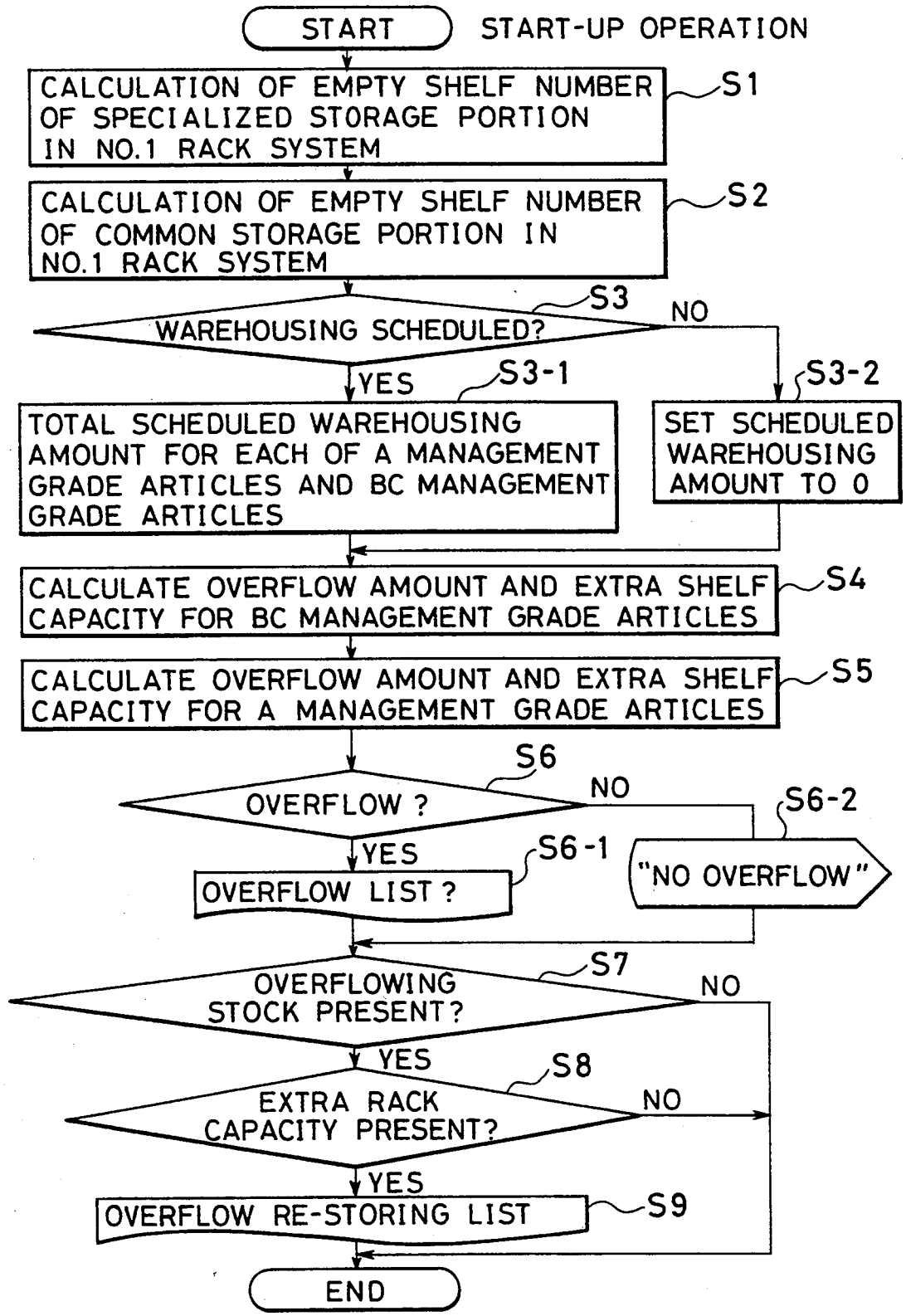
FIG. 7 is a flowchart showing an overflow calculation.

(2) Overflow Calculation Process (see FIG. 7)

In the foregoing warehousing process in (1), the overflow calculation process and overflowing article setting registration set out in 2) and 3) are performed by the following steps.

1) At first, at a step S1, the number of vacant shelves in the specialized storage portion for the A management grade articles in the No. 1 rack system 11 is calculated. With respect to the A management grade articles, the stock amount in the specialized storage portion in the No. 1 rack system 11 is checked and thus the number of the vacant shelves in the specialized storage portion of the No. 1 rack for each kind of the A management grade articles is obtained. Thereafter, by summing the obtained number of the vacant shelves, the number of empty shelves of the specialized storage portion (total empty shelf number of the specialized storage portion) of the No. 1 rack system 11 is obtained.

2) Subsequently, at a step S2, the number of vacant shelves in the A management grade article common storage portion is derived through the following process.

From the empty shelf file, the total empty shelf number (total empty shelf number in the No. 1 rack system 11) of the A management grade articles specialized storage portion and the A management grade articles common storage portion in the No. 1 rack system 11 is checked. By subtracting the total vacant shelf number in the A management grade articles storage portion derived through the process set forth above, from the total empty shelf number of the No. 1 rack system 11, the number of vacant shelves in the A management grade articles common storage portion is obtained.

3) At a step S3, judgement is made whether the warehousing is to be performed in the current date (whether the scheduled warehousing data is present or not). If present, the total scheduled warehousing numbers are calculated with respect to A management grade articles and BC management grade articles (step S3-1), and otherwise the scheduled warehousing number is set to 0 (step S3-2). Thereafter, the process is advanced to a step S4.

4) At the step S4, the amount to be overflown will be calculated with respect to the BC management grade articles.

The amount of the BC management grade articles to be warehoused in excess of the capacity of the vacant shelves in the No. 2 and No. 3 rack systems 12 and 13 becomes the overflow amount. If there can be left some shelves empty in the BC management grade articles common storage portion even after warehousing all amount of the BC management grade articles, the number of such empty shelves can serve as an extra rack number for the BC management grade articles so as to be made available for accepting overflow amount of the BC management grade articles. Detailed description therefor will be given herebelow.

At first, when a difference derived by subtracting the number of empty shelves in the No. 2 and No. 3 rack systems 12 and 13 from the scheduled warehousing amount of the BC management grade articles, is a positive value, it represents lack of shelves for receiving all of the BC management grade articles scheduled for warehousing. In this case, the obtained difference becomes the overflow amount. In such case, the available amount (possible warehousing amount) for warehousing the A management grade articles in the No. 2 and No. 3 rack systems 12 and 13 becomes 0.

On the other hand, when the difference derived by subtracting the vacant shelf number in the No. 2 and No. 3 rack systems 12 and 13 from the scheduled warehousing amount of the BC management articles is 0 or negative, the overflow amount of the BC management grade articles becomes 0. Then, extra vacant shelf number is calculated. Calculation of the extra vacant shelf number for storing the BC management grade articles is performed by subtracting the current stock amount of the BC management grade articles and the scheduled warehousing amount of the BC management grade articles in the No. 2 and No. 3 rack systems 12 and 13 from the BC management grade article storage frame number (number of shelves in the BC management article common storage portion).

When the extra shelf number of the BC management grade articles is negative, the extra shelf number is set at 0 and the possible warehousing number of the A management grade article to the No. 2 and No. 3 rack systems 12 and 13 is calculated. On the other hand, when the extra shelf number is 0 or positive, the corresponding value will be used as the extra shelf number for accepting the A management grade articles in the No. 2 and No. 3 rack systems 12 and 13.

The possible warehousing amount of the A management grade articles in the No. 2 and No. 3 rack systems 12 and 13 is delivered by subtracting the scheduled warehousing amount of the BC management grade articles and the BC management grade article extra shelf number from the empty shelf number in the No. 2 and No. 3 rack systems 12 and 13. The foregoing contents can be expressed by the following equations (1) and (2):

BC management grade article rack extra number =
BC management grade storage frame number − BC management grade article stock amount − BC management grade article scheduled warehousing amount . . . (1)
Possible warehousing amount of A management grade articles in No. 2 and No. 3 rack systems = No. 2 and No. 3 rack system empty shelf number − BC management article scheduled warehousing amount − BC management grade article rack extra number . . . (2)
If BC management grade article extra rack number < 0
→ BC management grade article extra rack number = 0
IF BC management grade article extra rack number ≧ 0
→ BC management grade article extra rack number obtained by the equation (1) is used 5) If overflow of the BC management grade article will occur, the A management grade articles cannot be warehoused in the No. 2 and No. 3 rack systems 12 and 13. If there are some empty shelves left even after warehousing all of the BC management grade articles, in the ABC management grade articles common storage portion, the corresponding empty shelf number will become the available warehousing amount for the A management grade articles for warehousing the A management grade articles in the No. 2 and No. 3 rack systems 12 and 13. When the scheduled warehousing amount of the A management grade articles is greater than the total amount of the possible warehousing amount of the A management grade articles in the No. 2 and No. 3 rack systems 12 and 13 and the empty shelf number in the A management grade articles common storage portion, the excess amount of the A management grade articles are overflown. If smaller, re-storing of the overflowing A management grade articles is enabled. In the step S5, the overflow amount of the A management grade article is derived through the following processes.

The overflow amount is calculated by subtracting the possible warehousing amount of the A management grade articles in the No. 2 and No. 3 rack systems 12 and 13 and the empty shelf number (possible warehousing amount) in the A management grade article common storage portion from the scheduled warehousing amount of the A management grade articles. If the overflow amount thus derived is positive (or there are not sufficient shelves for accepting all of the scheduled amount of the A management grade articles), then the extra rack number for storing the A management grade articles (extra rack number in all of the No. 1, No. 2 and No. 3 rack systems 11, 12 and 13) is set at 0. On the other hand, when the overflowing amount is 0 or negative, then the overflow amount is set at 0 (unnecessary to overflow). Then, the extra rack number is calculated. The extra rack number is calculated by subtracting the scheduled warehousing amount of the A management grade articles from the possible warehousing amount for the A management grade articles in the No. 2 and No. 3 rack systems derived in the step S4, and the empty shelf number of the A management grade articles common storage portion of the No. 1 rack system 11.

6) At step S6, a check is performed about necessity of the overflow of the BC management grade articles or the A management grade articles with respect to the overflow amounts derived at the steps S4 and S5. If there is any overflow amount, the overflow list indicates output (step S6-1), otherwise, the control CPU 33 displays "there is no overflow" (step S6-2).

It should be noted that the content of the overflow list is the overflow amount, scheduled kinds of articles to be warehoused, scheduled warehousing amount, stock amount of each corresponding kind of articles in the automatic storage and so forth. The operator performs setting registration of the articles to be overflowed with determination of the articles to be a subject of overflowing, amount thereof and so forth based on the overflow list.

At this time, when overflow setting is performed, it is advantageous not to make overflow all or most kinds of warehousing articles in the extra amount out of the storage capacity but to allow overflow only for the limited kinds of the articles, in viewpoint of good administration, in the following points.

(a) Setting of the kinds of the overflow articles can be maintained in lesser number.

(b) Frequency of setting of kinds for re-storing of the overflow articles can be held smaller.

In view of this, it is preferred to select the kinds of the articles to be overflowed for the kinds of articles which have been the subjects of previous overflow (the articles stocked in the overflow area 26).

On the other hand, in setting the overflow, it is also preferred that the operator will select the articles which are not currently necessary to make overflow and set the currently necessary articles to the rack systems 11, 12 and 13 (the articles shorting the stock).

7) Through the steps S7 to S9, when the scheduled warehousing amount is smaller than the possible warehousing amount, and some articles are stocked in the overflow area 26, the amount of articles in the overflow area 26, which can be transferred to the rack systems 11 to 13, is calculated to generate an overflow re-storing list to output.

A check is constantly performed to determine whether any articles are left in the overflow area 26 or not, so that if no overflowing article is found, process is terminated and if an overflow article is present, judgement is made as to whether there is any extra rack number for transferring the overflowing articles.

If an extra rack is present, the overflow restoring list indicates output. Otherwise, the process is terminated.

It should be noted that the contents of the overflow re-storing list are the extra rack number, kinds of overflowing articles, amount, position in the overflow area, stock amount in the automatic storage, warehousing date and so forth.

The operator determines the articles, amount and so forth to be re-stored on the basis of the overflow re-storing list and performs setting for re-storing of the overflowing articles through the re-storing setting terminal provided in the floor where the corresponding overflow area is present.

At this time, when overflow re-storing setting is performed, the operator preferably selects the articles which are currently unnecessary, to leave in the overflow area 26 and sets the articles which are currently necessary (the articles shorting the stock) to re-store in the rack systems 11 to 13 with higher priority.

Figure 8:
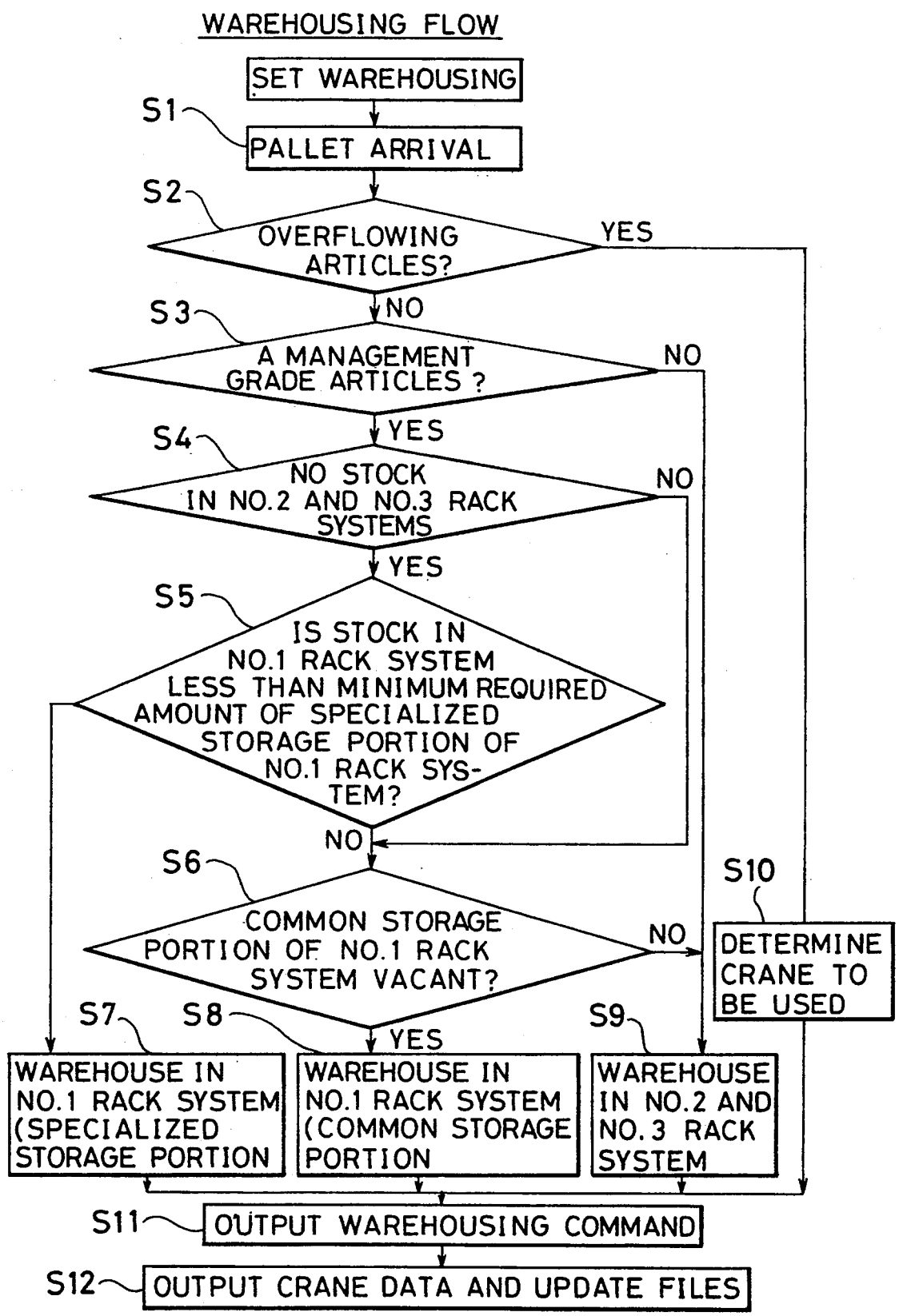
FIG. 8 is a flowchart showing a warehousing setting process.

(3) Warehousing Setting Process (see FIG. 8)

At the process in 5) of the warehousing process in (1), the warehousing setting process is performed in the following manner.

1) When the pallet reaches the branching end of the warehousing and delivery common conveyer 15, at which the warehousing command data is supplied (step S1), the destination of warehousing is determined through the following processes.

2) At a step S2, a check is performed to determine whether the currently handled articles are to be overflown or not (whether the articles are set as overflow articles or not). If the handling articles are to be overflown, the process jumps to a step S10 for determining the stacker crane 14 to be used (at this time, the crane selected should be one which is not in operation or having less assigned operations). Otherwise, the process is proceeded to a step S3.

3) At the step S3, judgement is made whether the currently warehousing articles is the A management grade articles or not. If the articles are not the A management grade articles, the process jumps to a step S9 to make decision that the warehousing is to be performed to the No. 2 and No. 3 rack systems 12 and 13. When the articles to be currently warehoused is the A management grade articles, the process is advanced to a step S4.

4) At the step S4, check is performed whether the same kind of the articles are present in the No. 2 and No. 3 rack systems 12 and 13. If the answer is affirmative, the process Jumps to a step S6. Otherwise, the process is advanced to a step S5.

5) At the step S5, a check is performed to determine whether the amount of the corresponding kind of the A management grade articles stocked in the A management grade articles specialized storage portion is smaller than the necessary shelf number (10 rack for one kind as set out above). If the stock amount is less than the necessary shelf number, the process is advanced to a step S7 to make judgement that the articles are to be warehoused in the A management grade articles specialized storage portion. When more than or equal to the necessary amount of the articles are stocked, the process is advanced to the step S6.

6) At the step S6, a check is performed to determine whether there are any vacant shelves in the A management grade articles common storage portion in the No. 1 rack system 11. If there is no vacant shelf, the process jumps to a step S9, and otherwise, process is advanced to a step S8.

7) At the step S8, a decision is made that the articles are to be warehoused in the A management grade articles common storage portion in the No. 1 rack 11.

8) As set forth, once the warehousing destination is determined at one of the steps S7, S8, S9 and S10, the control CPU 33 outputs a warehousing command to the conveyer controller 34 at a step S11. Then, transportation of the articles toward the warehousing destination (the rack systems 11 to 13 having the stacker cranes 14 for transferring to No. 1 rack system 11, the No. 2 rack system 12, No. 3 rack system 13 or the overflow area 26) to be warehoused is initiated.

9) The pallet for which the warehousing command is output at the step S11 is transported to the loading station of the warehousing conveyer 16. When the pallet reaches the loading station, the control CPU 33 determines the shelf in which the articles are to be stored. Then, the control CPU 33 outputs a crane operation signal to the crane controller 35. Also, the control CPU 33 updates the stock file and the shelf file (step S12).

The stacker crane 14 transfers the pallet on the loading station to the identified shelf or to the designated overflow floor.

(4) BC Management Articles Delivery Process

For delivery process for supplying the BC management grade articles to the pallet rack 20, the following process is performed.

1) The operator performs delivery setting by the control CPU 33 on the basis of the delivery instruction list output (printed) by the transporting CPU 32.

The control CPU 33 checks the stock amount in the No. 2 and No. 3 rack systems 12 and 13 of the automatic storage 10 so as to grate a stock shorting alarm on the display screen when the stock is low.

The control CPU 33 writes the delivery setting data (delivering floor, the article name and the number of pallets) in the delivery setting file.

2) The control CPU 33 controls the conveyer controller 34 and the crane controller 35 to perform delivery according to the delivery set data as set forth in 1). At this time, the control CPU 33 assigns the associated stacker crane 14 to the pallet having the oldest warehousing date in terms of the warehousing date rot. When pallets having the oldest warehousing date are present at a plurality of racks, the vacant crane 14 is assigned.

(5) A Management Grade Article Delivery Process

The delivery process for delivering the A management grade articles to the pallet flow conveyer 19 is performed according to the following processes.

1) When absence of the A management grade articles on the pallet flow conveyer 19 is detected, the control CPU 33 identifies the rack containing the pallet having the oldest warehousing date and output the operation command of the stacker crane 14 to the crane controller 35.

2) When the number of pallets having the oldest warehousing date in the No. 1 rack system 11 reaches 4, the control CPU 33 generates a storage transfer planning file for the corresponding pallets from the No. 2 and No. 3 rack systems 12 and 13 to the No. 1 rack system 11 in the unit of 6 pallets when the pallets having the oldest warehousing date are present in the No. 2 and No. 3 rack systems 12 and 13.

It should be noted that, when the A management grade articles stored in the No. 2 and No. 3 rack systems 12 and 13 are transferred to the No. 1 rack system 11, the conveyer arranged at the second floor is generally used. However, if the conveyer at the second floors is in use, the one at the third floor will be used.

Here, the automatic stock transfer is performed through the following processes. (see FIG. 9)

1) At a step S1, according to progress of delivery from the pallet flow conveyer 19, if the vacancy of pallet on the pallet flow conveyer 19 is detected (vacancy detection), the process is advanced to a step S2. Otherwise, the step S1 is repeated until the vacancy is detected.

2) At the step S2, the control CPU 33 checks the kind of articles registered for the pallet flow conveyer 19, at which the vacancy is detected. Then, the control CPU 33 outputs the delivery command for identifying the shelf location to the crane controller 35 so as to perform delivery from the A management grade articles specialized storage portion to the corresponding pallet flow conveyer 19. Then, the stacker crane 14 performs delivery operation for the identified article.

3) The control CPU 33 updates the empty shelf file with the information indicative of emptying of the shelf location identified by the delivery command. Also, the control CPU 33 checks the articles stocked in the A management grade articles common storage portion to determine whether the articles having the same warehousing date to the articles stocked in the A management grade articles specialized storage portion have the most recent warehousing date (step S3).

4) If the result of checking at the step S3 is positive, the process is advanced to a step S4, in which the data is transferred from the A management grade articles common storage portion to the A management grade articles specialized storage portion in the No. 1 rack system 11 (the shelf location is held unchanged).

5) When the answer at the step S3 is negative, the process is advanced to a step S5, in which a check is performed to determine the presence of articles stocked in the ABC management grade articles common storage portion and having the earlier warehousing date than that of the articles stocked in the A management grade articles common storage portion. If none are present, the process is advanced to the step S4, in which the articles stored in the A management grade articles common storage portion and having the warehousing date next to the most recent warehousing date is transferred to the A management grade articles specialized storage portion, in the No. 1 rack system 11 (only date is transferred).

6) At the step S5, when there are articles stocked in the ABC management grade articles common storage portions in the No. 2 and No. 3 rack systems 12 and 13 and having the warehousing date earlier than those stocked in the A management grade articles common storage portion of the No. 1 rack system 11, the process is advanced to a step S6, in which articles in the No. 2 and No. 3 rack systems 12 and 13 are transferred to the No. 1 rack system 11. After the control CPU 33 assigns the conveyer to be used for transferring operation (higher priority of assignment is given for the conveyer in the second floor and the conveyer in the third floor is assigned when the conveyer in the second floor is in use), the control CPU 33 commands transfer. Then, the articles stocked in the ABC management grade articles common storage portions of the No. 2 and No. 3 rack systems 12 and 13 are delivered and then warehoused in the A management grade articles common storage portion in the No. 1 rack system 11. In this case, the warehousing date will not be updated despite of the fact that the corresponding article is newly warehoused in the No. 1 rack system 11. The warehousing date indicates the first warehousing date in the automatic storage 10 and is held unchanged while the corresponding article is stocked therein.

It should be noted that, in the step S6, discussion has been given for transfer of one pallet, but it is possible to simultaneously transfer a plurality of pallets when the answer at the step S5 is positive. For instance, it is possible not to perform transfer of the articles until vacancy exists for 6 pallets, and to perform transfer for 6 pallets simultaneously when the vacancy exists for the 6 pallets. Such procedure may enhance the efficiency of the operation.

It should be further noted that in the above-mentioned automatic storage 10, the control CPU 33 constantly updates information to obtain the current status by updating the stock file at respective ones of the storage portions on the basis of the warehousing information and the delivery information of the rack systems 11 to 13 and the overflow area 26 respectively.

In the above-mentioned automatic storage, the common storage portion in the No. 1 rack system 11 may be used for storing not only the A management grade articles but other management grade articles.

According to the article warehousing method as set forth above, a check is performed to determine whether the intended amount of articles can be warehoused in the automatic storage 10 or not, in advance of actually initiating warehousing operation, and the currently unnecessary articles can be stored in the overflow area 26 (other storage facility) when all of the intended amount of articles cannot be stored and currently necessary articles are warehoused in the automatic storage 10 with high priority.

In addition, in the warehousing and delivery method according to the invention, using the automatic storage 10 (storage facility) which comprises the No. 1 rack system 11 (primary storage facility) having the A management grade articles specialized storage portion and the A management grade articles common storage portion, and the No. 2 and No. 3 rack systems 12 and 13 respectively having the ABC management grade articles common storage portion (auxiliary storage facility), it is facilitated to perform pushup type delivery for the same kind of articles (A management grade articles) so that the articles are delivered in the order of the earliest warehousing date.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A delivery method for delivering articles from a storage including a primary storage facility having specialized storage portion exclusively storing preliminarily registered articles and a common storage portion for randomly storing articles, characterized in that when one kind of articles has an earlier warehousing date than that of the corresponding kind of articles stocked in said common storage portion of said primary storage facility and there is a vacant space in said specialized storage portion of said primary storage facility, the articles in said auxiliary storage facility are delivered after being transferred to said specialized storage portion of said primary storage facility.

2. An article transfer method for transferring articles between a primary storage facility having a specialized delivery port for exclusively delivering preliminarily registered articles and an auxiliary storage facility, characterized in that when a specialized storage portion for exclusively storing preliminarily registered articles becomes vacant, and when the articles having the oldest warehousing date are stocked in said auxiliary storage facility, said oldest articles are transferred to said specialized storage portion of said primary storage facility.

3. A method of warehousing articles collectively in an automatic storage facility comprising the steps of:
collectively arranging kinds and amounts of all articles to be warehoused before initiating the warehousing thereof;
comparing a schedule of articles to a warehoused amount of articles and an empty shelf number in the automatic storage facility;
outputting if the empty shelf number is insufficient, a list containing data of overflow amount, scheduled warehousing amount of each scheduled kind of articles to be warehoused and stock amount of each kind of articles in the automatic storage facility;
selecting articles to be warehoused and those not to be warehoused with reference to the list;
depositing selected articles to be warehoused;
conveying the articles not to be warehoused to a separate storage area with a crane of an automatic storage facility;
outputting if the empty shelf number is large, a restoring list containing data of empty shelf numbers of an automatic storage facility, kinds and amounts of articles stored in the separate storage area and stock amount of each corresponding kind of articles in the automatic storage facilities;
selecting articles to be warehoused from the separate storage area to the automatic storage facility with reference to the restoring list; and
then, initiating the warehousing of articles from the separate storage area.

4. A method of warehousing articles according to claim 3, wherein data of the kinds and amounts of articles are inputted when warehousing the articles, and after completion of warehousing of all the articles, articles are subjected to warehousing inspection by displaying a scheduled warehousing amount and a resultant warehousing amount for each kind of article warehoused.

5. A method of warehousing articles in a storage facility with a plurality of cranes, at least one of the cranes having a rack with a plurality of storage positions for receiving only a registered kind of article, the method comprising the steps of:
registering a least storage amount of articles stored in a delivery-only position or the rack;
warehousing that kind of article in the rack until the least storage amount is stored;
warehousing that kind of article on an empty shelf, if available, when the least storage amount of that article has been stored in the rack, and when the least storage amount of all kinds of articles have been stored;
subtracting a deficiency of each kind of insufficient article from an empty shelf; and
warehousing that kind of article in an empty shelf, if available, or in a different rack, if a shelf is not available.

6. A method of warehousing according to claim 5, wherein only a kind of article registered for a delivery-only storage portion of a rack is stored in that rack with that delivery-only storage portion.

* * * * *